（12）United States Patent
Lee et al.

(10) Patent No.: US 10,865,509 B2
(45) Date of Patent: Dec. 15, 2020

(54) WASHING MACHINE

(71) Applicant: LG Electronics Inc., Seoul (KR)

(72) Inventors: Jeonguk Lee, Seoul (KR); Seyoung Woo, Seoul (KR); Taehee Lee, Seoul (KR); Joonho Pyo, Seoul (KR)

(73) Assignee: LG Electronics Inc., Seoul (KR)

( * ) Notice: Subject to any disclaimer, the term of this patent is extended or adjusted under 35 U.S.C. 154(b) by 5 days.

(21) Appl. No.: 16/195,494

(22) Filed: Nov. 19, 2018

(65) Prior Publication Data

US 2019/0153646 A1    May 23, 2019

Related U.S. Application Data

(62) Division of application No. 16/195,013, filed on Nov. 19, 2018.

(30) Foreign Application Priority Data

Nov. 17, 2017 (KR) .................. 10-2017-0153826
Feb. 23, 2018 (KR) .................. 10-2018-0022108

(51) Int. Cl.
| | |
|---|---|
| *D06F 37/40* | (2006.01) |
| *D06F 23/04* | (2006.01) |
| *D06F 37/30* | (2020.01) |
| *F16D 11/14* | (2006.01) |
| *F16H 25/20* | (2006.01) |
| *F16H 1/28* | (2006.01) |

(Continued)

(52) U.S. Cl.
CPC .............. *D06F 37/40* (2013.01); *D06F 23/04* (2013.01); *D06F 37/30* (2013.01); *F16D 11/04* (2013.01); *F16D 11/14* (2013.01); *F16D 23/12* (2013.01); *F16H 1/28* (2013.01); *F16H 25/20* (2013.01); *F16H 57/02* (2013.01); *F16D 2023/123* (2013.01)

(58) Field of Classification Search
CPC .......... D06F 37/30; D06F 37/40; D06F 23/04; F16D 11/04; F16D 23/12; F16D 2023/123; F16D 11/14; F16H 1/28; F16H 25/20; F16H 57/02
See application file for complete search history.

(56) References Cited

U.S. PATENT DOCUMENTS

| | | | |
|---|---|---|---|
| 2006/0075789 A1* | 4/2006 | Lee | D06F 37/40 68/12.24 |
| 2009/0211035 A1 | 8/2009 | Kim et al. | |
| 2017/0327989 A1 | 11/2017 | Farrington et al. | |

FOREIGN PATENT DOCUMENTS

| | | | | |
|---|---|---|---|---|
| EP | 3406784 A1 * | 11/2018 | ............. | D06F 37/40 |
| WO | WO 2004/069020 A2 | 8/2004 | | |
| WO | WO 2017/126822 A1 | 7/2017 | | |

* cited by examiner

*Primary Examiner* — Joseph L. Perrin
(74) *Attorney, Agent, or Firm* — Birch, Stewart, Kolasch & Birch, LLP

(57) ABSTRACT

The present invention relates to a washing machine including an outer tub which accommodates wash water, an inner tub which is disposed in the outer tub to accommodate laundry, and which rotates around a vertical axis, a motor which provides torque, an outer shaft which has a hollow, and which rotates the inner tub, an inner shaft which rotates inside the hollow by the motor, a pulsator which is disposed in the inner tub and is connected to the inner shaft, and a clutch which is screw-coupled to the inner shaft in the hollow formed at the outer shaft, and which is engaged with the outer shaft so as to be raised by the rotation of the inner shaft.

5 Claims, 14 Drawing Sheets

(51) Int. Cl.
  *F16H 57/02* (2012.01)
  *F16D 23/12* (2006.01)
  *F16D 11/04* (2006.01)

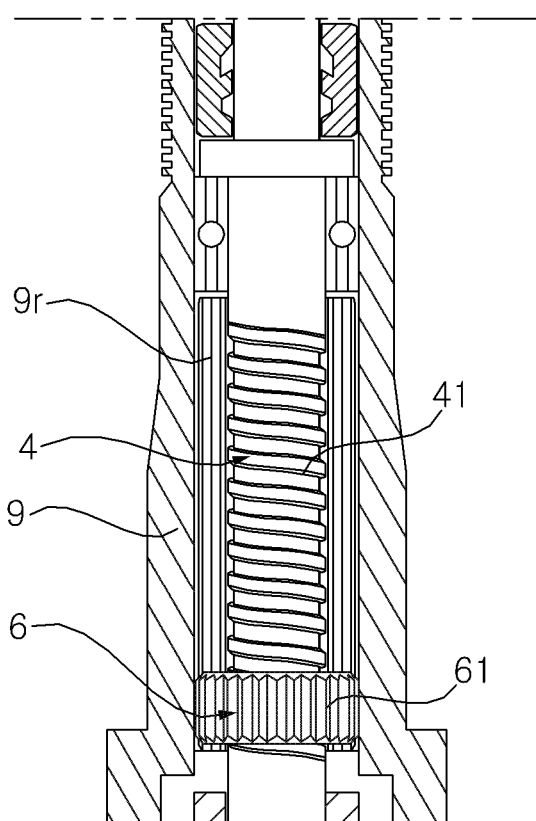

WASHING MACHINE

CROSS-REFERENCE TO RELATED APPLICATIONS

This application is a Divisional Application of U.S. application Ser. No. 16/195,013, filed on Nov. 19, 2018, which claims the priority benefit of Korean Patent Application No. 10-2017-0153826, filed on Nov. 17, 2017 and No. 10-2018-0022108, filed on Feb. 23, 2018 in the Korean Intellectual Property Office, the disclosure of all of which is incorporated herein by reference.

BACKGROUND OF THE INVENTION

1. Field of the Invention

The present disclosure relates to a washing machine with a clutch system for connecting or disconnecting a wash shaft and a dehydration shaft.

2. Description of the Related Art

Generally, a washing machine has an outer tub provided in a casing, an inner tub which is provided in the outer tub to accommodate laundry and is rotatable around a vertical axis, and a pulsator which is provided in the inner tub to stir washing water.

The washing machine includes a motor for driving the inner tub and the pulsator. The motor transfers power through dual shafts including an inner shaft and an outer shaft. The inner shaft is a shaft for rotating the pulsator and is directly connected to the motor, such that every time the motor rotates, the pulsator rotates along with the motor. The outer shaft is a shaft for rotating the inner tub, and is configured to be connected to, or disconnected from, the inner shaft by a clutch.

That is, when the outer shaft and the inner shaft are connected by the clutch, the pulsator and the inner tub rotate together; by contrast, when the outer shaft and the inner shaft are disconnected, only the pulsator rotates while the inner tub is in a stationary state.

Korean Laid-open Patent Publication No. 2000-0063005 discloses a clutch applied to a washing machine. The clutch has several gears, a lever for operating the gears, and the like, such that the clutch structure is complicated, and requires a separate motor for operating the gears and the lever.

SUMMARY OF THE INVENTION

It is an object of the present invention to provide a washing machine with a simplified clutch system for connecting (shaft-coupling) or disconnecting a wash shaft and a dehydration shaft, in which the clutch system operates not by a separate driving source but by a motor that rotates a pulsator. That is, without any need for a separate control means for controlling the clutch system, the washing machine may control the clutch system by controlling rotation of a motor that rotates the pulsator.

Further, it is another object of the present invention to provide a washing machine with a clutch system, in which the number of components of the clutch system may be reduced, and a separate motor generally used for operating the clutch system, as well as other components used in connection with the motor, may be omitted.

In addition, it is yet another object of the present invention to provide a washing machine with a clutch system, in which even when the inner shaft is rotated by strong torque using a planetary gear train, the torque may be stably transferred from the inner shaft to the outer shaft through the clutch system.

In accordance with an aspect of the present invention, the above and other objects can be accomplished by providing a washing machine including an outer tub which accommodates wash water, an inner tub which is disposed in the outer tub to accommodate laundry, and which rotates around a vertical axis, a motor which provides torque, an outer shaft which has a first hollow, and which rotates the inner tub, an inner shaft which rotates by the motor in the first hollow, a pulsator which is disposed in the inner tub and is connected to the inner shaft, and a clutch which is screw-coupled to the inner shaft in the first hollow formed at the outer shaft, and which is spline-coupled to the outer shaft.

When the inner shaft rotates in a forward direction, and the clutch reaches a predetermined raised position, the clutch may be restrained from being raised further, and the outer shaft may rotate in the forward direction, and when the inner shaft rotates in a reverse direction, and the clutch reaches a predetermined lowered direction, the clutch may be restrained from being lowered further, and the outer shaft may rotate in the reverse direction.

In accordance with another aspect of the present invention, the above and other objects can be accomplished by providing a washing machine including an outer tub which accommodates wash water, an inner tub which is disposed in the outer tub to accommodate laundry, and which rotates around a vertical axis, a motor which provides torque, an outer shaft which has a first hollow, and which rotates the inner tub, an inner shaft which rotates inside the first hollow by the motor, a pulsator which is disposed in the inner tub and is connected to the inner shaft, a clutch which is screw-coupled to the inner shaft in the first hollow formed at the outer shaft, and an elevation guide which rotates along with the inner tub when the inner tub rotates, and which restricts rotation of the clutch when the inner shaft rotates, so as to elevate the clutch.

When the inner shaft rotates in a forward direction, and the clutch reaches a predetermined raised position, the clutch may be restrained from being raised further and the elevation guide rotates in the forward direction, and when the inner shaft rotates in a reverse direction, and the clutch reaches a predetermined lowered direction, the clutch may be restrained from being lowered further and the elevation guide rotates in the reverse direction.

The washing machine may further include a planetary gear train which transfers torque of the motor to the inner shaft.

In addition, the washing machine may further include a gear housing which accommodates the planetary gear train, and is shaft-coupled to the outer shaft. The planetary gear train may include a ring gear which is fixed to an inner circumferential surface of the gear housing, a sun gear which is connected to a drive shaft of the motor, a plurality of pinion gears which are interposed between the sun gear and the ring gear, to be engaged with the sun gear and the ring gear, and a carrier which rotatably supports the plurality of pinion gears to rotate when the plurality of pinion gears revolve around the ring gear, and which is connected to the inner shaft to rotate the inner shaft by the rotation.

The gear housing may include a lower housing which is disposed below the planetary gear train, and has a second hollow through which the drive shaft passes, and an upper housing which is disposed above the lower housing and is connected to the lower housing so that a space for accommodating the planetary gear train is formed therebetween, and is shaft-coupled to a lower end portion of the outer shaft.

The carrier may include a boss which is shaft-coupled to the inner shaft, in which the carrier may further include a bearing which is interposed between the boss and the outer shaft.

BRIEF DESCRIPTION OF THE DRAWINGS

FIGS. 3(a) and 3(b) are partially cut-away views of portion "A" of FIG. 1, in which FIG. 3(a) illustrates a state where a clutch is in an upper position, and FIG. 3(b) illustrates a state where a clutch is in a lower position.

FIGS. 11(a) and 11(b) are partially cut-away views of portion "A" of FIG. 8, in which FIG. 11(a) illustrates a state where a clutch is in a lowered position, and FIG. 11(b) illustrates a state where a clutch is in a raised position.

DETAILED DESCRIPTION OF THE PREFERRED EMBODIMENTS

Figure 1:
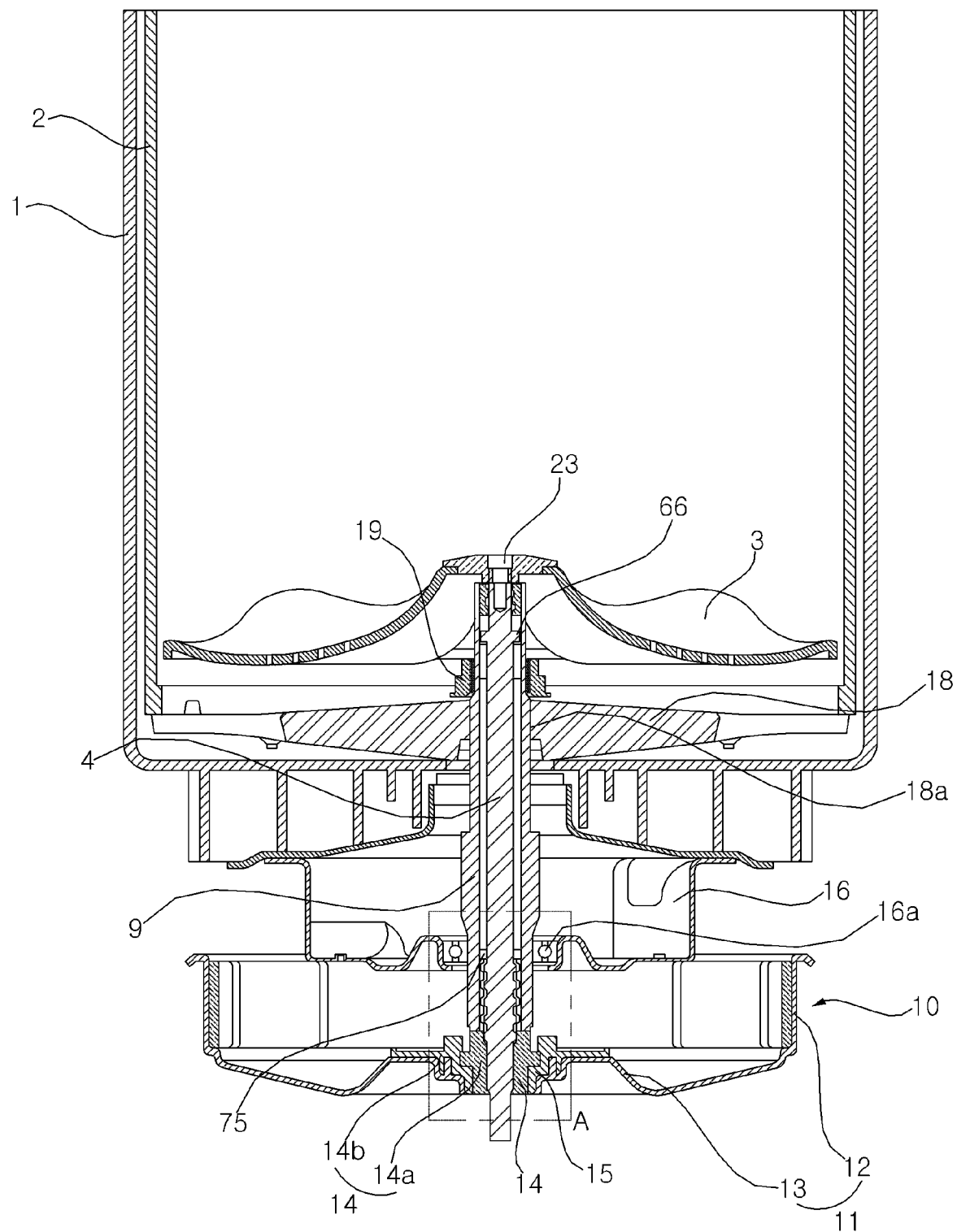
FIG. 1 is a longitudinal cross-sectional view of a washing machine according to an embodiment of the present disclosure.

Advantages and features of the present invention and methods for achieving them will be made clear from the embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is defined only by the scope of the claims. Like reference numerals refer to like elements throughout the specification.

Figure 2:
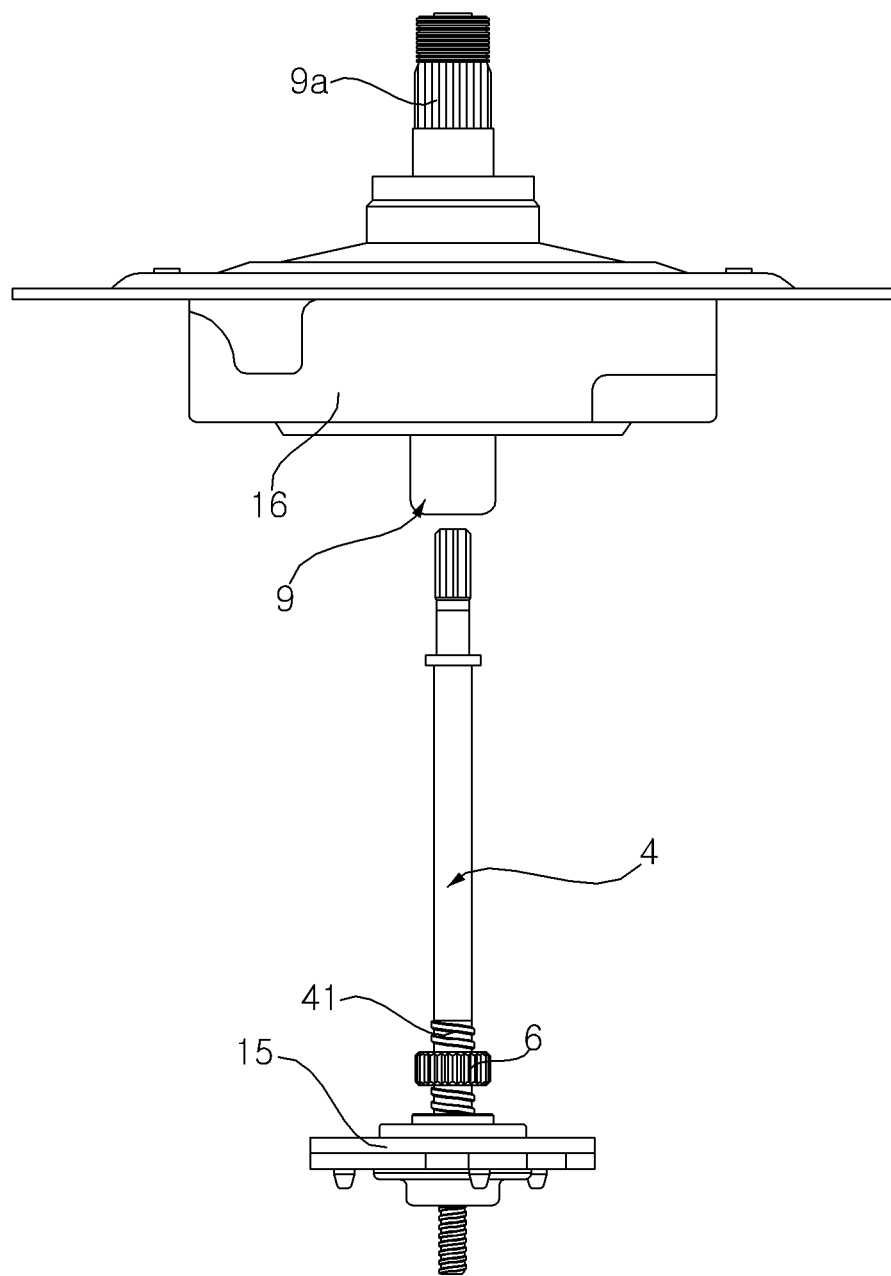
FIG. 2 is an exploded view of principal parts of FIG. 1.
Figure 3A:
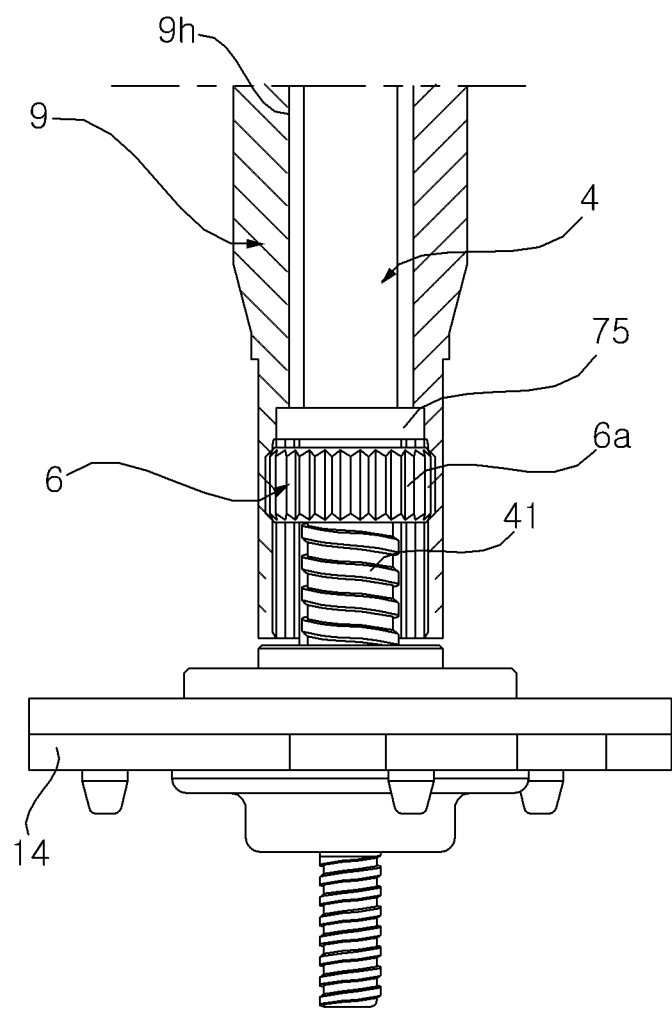
Figure 3B:
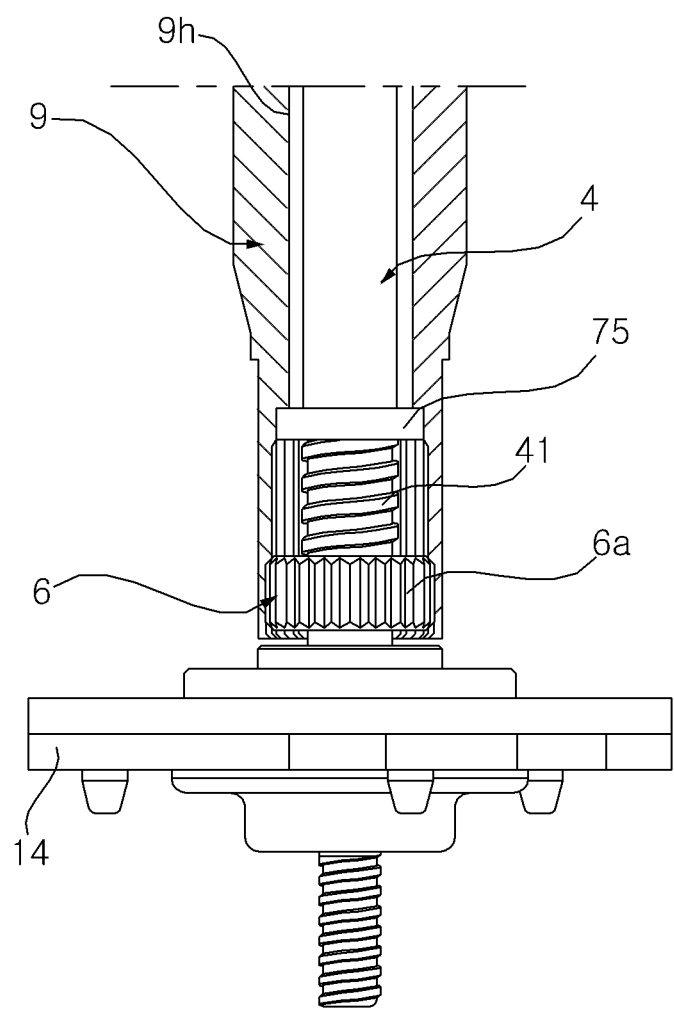

FIG. 1 is a longitudinal cross-sectional view of a washing machine according to an embodiment of the present disclosure. FIG. 2 is an exploded view of principal parts of FIG. 1. FIGS. 3(a) and 3(b) are partially cut-away views of portion "A" of FIG. 1, in which FIG. 3(a) illustrates a state where a clutch is in a raised position, and FIG. 3(b) illustrates a state where a clutch is in a lowered position.

Referring to FIGS. 1 to 3, the washing machine according to an embodiment of the present disclosure includes an outer tub 1 which accommodates wash water, an inner tub 2 which is disposed in the outer tub 1 to accommodate laundry, and rotates around a vertical axis, a pulsator 3 which is disposed in the inner tub 2, and a motor 10 which provides torque.

The outer tub 1 is disposed in a casing (not shown) which forms an external appearance of the washing machine. The outer tub 1 may be suspended in the casing by a support rod (not shown). The support rod may be provided at each of four corners of the casing, and may be connected to the outer tub 1 by a suspension (not shown) which absorbs vibration of each support rod.

The motor 10 may rotate in forward/reverse directions, and the pulsator 3 and the inner tub 2 may rotate by the motor 10. It is desired that the motor 10 is a Brushless Direct Current electric motor (BLDC), but is not necessarily limited thereto.

The motor 10 is an outer rotor type motor having, at the center, a stator (not shown) around which induction coils are wound, and a rotor 11 which rotates around the stator. The rotor 11 includes a bottom part 13, and a ring-shaped side part 12 which is extended upwardly from the bottom part 13.

A lower end portion of the inner shaft 4 may be connected by a rotor bush 14 to a rotor hub 15 which is fixed to the bottom part 13. Five magnets (not shown) are arranged on an inner circumferential surface of the side part 12 of the motor 10 along a circumferential direction, so as to rotate the rotor 11 by a magnetic field generated between the stator and the magnets.

The inner shaft 4 is connected to the pulsator 3. The pulsator 3 has coupling holes formed at the center, and screws 23 pass through the coupling holes from top to bottom to be coupled to the inner shaft 4.

An outer shaft 9 is connected to the inner tub 2, and has a tubular shape with a hollow 9h through which the inner shaft 4 passes. A hub base 18, which is connected to the bottom of the inner tub 2, may be provided at a lower part of the inner tub 2. An opening is formed at the center of the bottom of the inner tub 2, and a coupling member, such as a screw or a bolt, passes through portions of the hub base 18 which come into contact with the circumference of the opening, such that the hub base 18 may be coupled to the bottom of the inner tub 2.

When the outer shaft 9 rotates, the hub base 18 rotates along with the outer shaft 9. The outer shaft 9 is engaged (or tooth-engaged) with the hub base 18. A tooth surface 9a (see FIG. 2), which forms a spline, may be formed on the outside of the outer shaft 9. The hub base 18 may be formed in a disc shape, and may have, at the center, a boss 18a through which the outer shaft 9 passes. A tooth groove, which is engaged with the tooth surface, may be formed on an inner circumferential surface of the boss 18a. As a concavo-convex portion, such as tooth, key, and the like, is engaged with the tooth groove formed at the boss 18a, torque may be transferred to the hub base 18 during rotation of the outer shaft 9.

After passing through the boss 18a of the hub base 18, the outer shaft 9 may protrude upwards, and the protruding portion may be coupled to a nut 19. Further, a seal 66, which performs sealing to prevent water contained in the inner tub 2 from penetrating into the hollow 9h, may be provided at the protruding portion.

A bearing housing 16 may be disposed below the outer tub 1. The bearing housing 16 may be connected to a bottom surface of the outer tub 1. A bearing 16a, which supports the outer shaft 9, may be provided in the bearing housing 16.

The inner shaft 4 rotates every time the motor 10 rotates. For rotation of the inner tub 2, torque provided by the motor 10 should be transferred from the inner shaft 4 to the outer shaft 9, and the transfer of torque is performed by a raising and lowering motion of the clutch 6.

The clutch 6 is disposed between the inner shaft 4 and the outer shaft 9. The clutch 6 may be raised and lowered while being engaged (or tooth-engaged) with the outer shaft 9, and may be screw-coupled to the inner shaft 4, to be raised and lowered by rotation of the inner shaft 4 between a raised position (see FIG. 3(a)) and a lowered position (see FIG. 3(b)). The clutch 6 may be made of a steel material.

The outer circumferential surface of the clutch 6 may be spline-coupled to the inner circumferential surface of the outer shaft 9 which defines the hollow 9h, so that the clutch 6 may be raised or lowered with respect to the outer shaft 9. For example, a tooth surface, which forms a spline, may be formed on the outer circumferential surface of the clutch 6, and a tooth groove, which is engaged with the tooth surface, may be formed on the inner circumferential surface of the outer shaft 9. A cross section of the teeth, which form the spline, may have a triangle shape, such that serrations, which are engaged with each other, may be formed on the outer circumferential surface of the clutch 6 and the inner circumferential surface of the outer shaft 9 respectively (serration coupling). The spline-coupling is just one example of an anti-rotation interface interconnecting the clutch and the outer shaft.

The concavo-convex portion, such as tooth, key, and the like, which is formed on the tooth surface of the clutch 6, is engaged with the tooth groove formed on the inner circumferential surface of the outer shaft 9, such that in the case where the clutch 6 is no longer raised after reaching a raised position, or is no longer lowered after reaching a lowered position, torque is transferred to the outer shaft 9 through the clutch 6, which will be described in further detail later.

A helix thread 41 is formed on the outer circumferential surface of the inner shaft 4 along an axial direction, and a thread (not shown), which is engaged with the thread 41, is formed on the inner circumferential surface of the clutch 6.

The outer circumferential surface of the clutch 6 is spline-coupled to the inner circumferential surface of the outer shaft 9, and the inner shaft 4 and the clutch 6 are screw-coupled, such that when the inner shaft 4 rotates while a raising or lowering motion of the clutch 6 is not restricted, the clutch 6 is raised or lowered according to a rotational direction of the inner shaft 4 while rotating relative to the thread 41. In this case, only the pulsator 3 rotates while the inner tub 2 is in a stationary state.

Hereinafter, a rotational direction of the inner shaft 4, which induces the clutch 6 to be raised, will be referred to as a forward direction, and a direction opposite to the forward direction will be referred to as a reverse direction.

As the inner shaft 4 rotates in the forward direction, the clutch 6 reaches a predetermined raised position (see FIG. 3(a)) and is restrained from being raised further. When the inner shaft 4 continues to rotate in the forward direction while the clutch 6 is restricted from being raised, the outer shaft 9 also rotates in the forward direction.

By contrast, as the inner shaft 4 rotates in the reverse direction, the clutch 6 reaches a predetermined lowered position (see FIG. 3(b)) and is restrained from being lowered further. When the inner shaft 4 continues to rotate in the reverse direction while the clutch 6 is restricted from being lowered, the outer shaft 9 also rotates in the reverse direction.

At least one of the raised position and the lowered position of the clutch 6 may be restricted by the thread 41. That is, when the clutch 6 rotates relative to the inner shaft 4 in the reverse direction and reaches the top of the thread 41, the clutch 6 may no longer rotate, and thus its raising motion is restricted and the position of the clutch 6 at this point is determined to be a raised position.

By contrast, when the clutch 6 rotates relative to the inner shaft 4 in the forward direction and reaches the bottom of the thread 41, the clutch 6 may no longer rotate, and thus its lowering motion is restricted and the position of the clutch 6 at this point is determined to be a lowered position.

Unlike the above embodiment, an upper stopper, which restrains the clutch 6 from being raised, and/or a lower stopper which restrains the clutch 6 from being lowered, may also be included. For example, the bearing 27 interposed between the inner shaft 4 and the outer shaft 9 may be the upper stopper. A bearing may be further included to be used as the lower stopper.

The upper stopper may be a bush 75 fixed to the inner shaft 4. In this case, when the clutch 6 comes into contact with the bush 75 while being raised, the clutch 6 may no longer be raised. Further, according to an embodiment, the upper stopper may be a protrusion that is formed at the inner shaft 4 or the outer shaft 9 to restrict movement of the clutch 6. For example, the upper stopper or the lower stopper may be formed by putting a ring on the inner shaft 4 or by forming a protrusion at the outer circumferential surface of the inner shaft 4. However, the upper stopper and the lower stopper are not limited thereto, and may be provided in various known manners.

The lower stopper may be the rotor bush 14 or the rotor hub 15. In this case, when the clutch 6 comes into contact with the rotor bush 14 or the rotor hub 15 while being lowered, the clutch 6 may no longer be lowered. Further, according to an embodiment, the lower stopper may be a protrusion that is formed at the inner shaft 4 or the outer shaft 9 to restrict movement of the clutch 6. However, the upper stopper and the lower stopper are not limited thereto, and may be provided in various known manners.

A movement area of the clutch 6 inside the hollow 9h formed at the outer shaft 9 may be provided outside of the inner tub 2. Further, the movement area of the clutch 6 may be provided below the outer tub 1. Because the movement area of the clutch 6 (or a space for installing or operating the clutch 6) is not provided inside the inner tub 2, the pulsator 3 may be disposed on the bottom of the inner tub 2, as in the case of a general washing machine.

Hereinafter, a motion of the clutch 6 will be described with reference to FIGS. 3(a) and 3(b).

FIG. 3(a) illustrates a state where the clutch 6 reaches the raised position. In this state, when the inner shaft 4 rotates in the forward direction, the clutch 6 may no longer be raised, such that the outer shaft 9 rotates in the forward direction. This is the case where the pulsator 3 and the inner tub 2 rotate together in the forward direction.

By contrast, when the inner shaft 4 rotates in the reverse direction while the clutch 6 reaches the raised position, the outer shaft 9 is maintained in a stationary state due to inertia or load on the outer tub 1, and the clutch 6 is lowered. In this case, only the pulsator 3 rotates while the inner tub 2 is in a stationary state.

In addition, a maximum angle (or number of rotations), at which the pulsator 3 may continuously rotate while the inner tub 2 is in a stationary state, may be determined according to a maximum angle (or number of rotations) at which the clutch 6 may continuously rotate between the lowered position and the raised position. In the section where the clutch 6 is raised, the pulsator 3 may rotate in the forward direction or the reverse direction according to a rotational direction of the motor 10.

Particularly in the case where the clutch 6 is between the raised position and the lowered position without reaching either one of these positions, the rotational direction of the pulsator 3 is determined according to the rotational direction of the inner shaft 4, such that by controlling the rotational direction of the motor 10, stirring rotation of the pulsator 3 may be induced.

FIG. 3(b) illustrates a state where the clutch 6 reaches the lowered position. In this state, when the inner shaft 4 rotates in the reverse direction, the clutch 6 may no longer be lowered, such that the outer shaft 9 rotates in the reverse direction. This is the case where the pulsator 3 and the inner tub 2 rotate together in the reverse direction.

Figure 4:
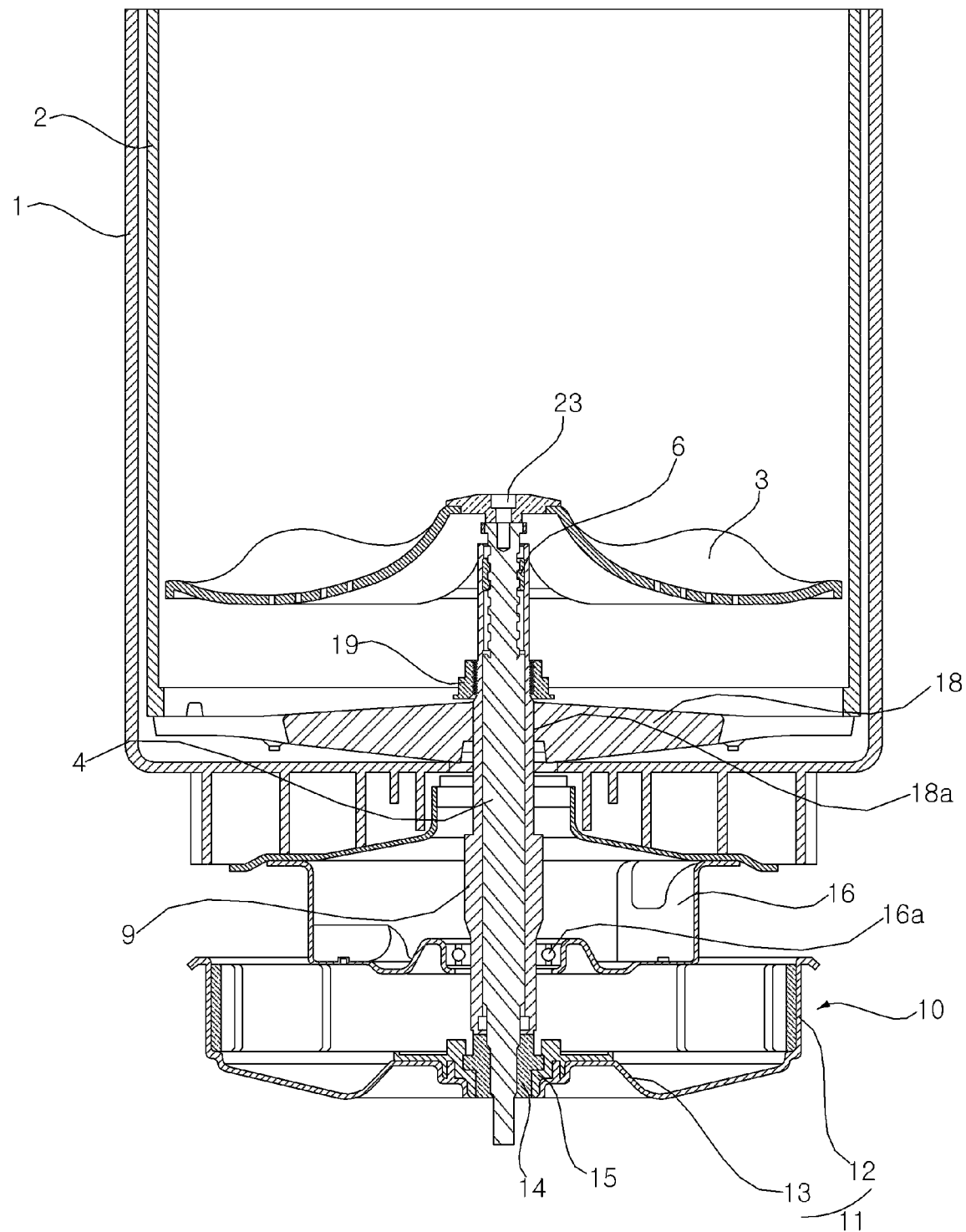
FIG. 4 is a longitudinal cross-sectional view of a washing machine according to another embodiment of the present disclosure.

FIG. 4 is a longitudinal cross-sectional view of a washing machine according to another embodiment of the present disclosure. The same parts as those described in the above embodiments are denoted by the same reference numerals, and these parts are described above, such that detailed description thereof will be omitted.

The washing machine according to the embodiment of the present disclosure has parts which are substantially the same as those described in the above embodiments, except that the clutch 6 is installed at a different position. That is, the clutch 6 is disposed inside the hollow 9h formed at the outer shaft 9, and at least a portion of a movement area of the clutch 6 is provided inside the inner tub 2.

In the embodiment, the entire movement area of the clutch 6 is provided inside the inner tub 2, but is not limited thereto, and the clutch 6 may be configured to be lowered below the inner tub 2.

The movement area of the clutch 6 may be provided below the pulsator 3.

Figure 5:
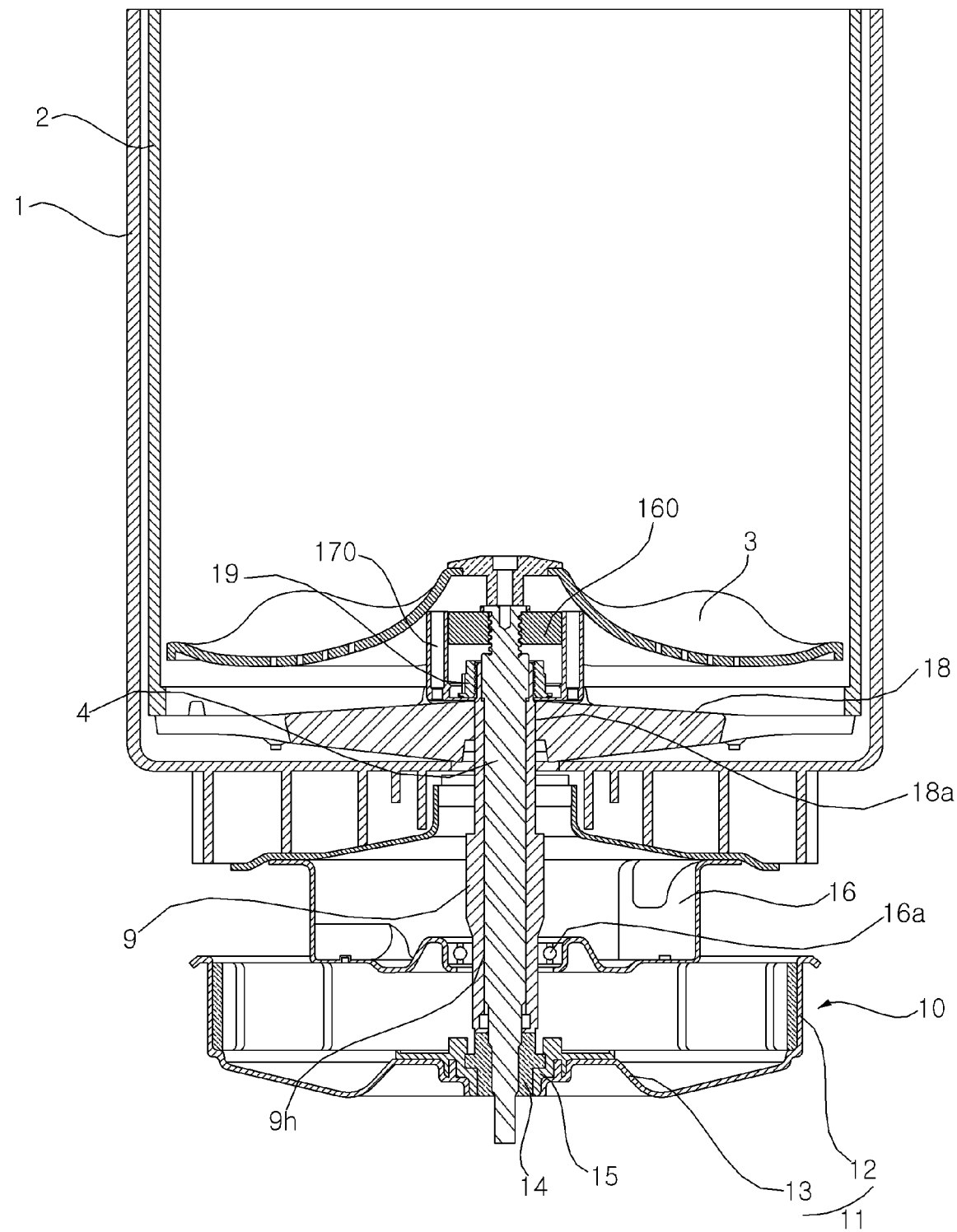
FIG. 5 is a longitudinal cross-sectional view of a washing machine according to yet another embodiment of the present disclosure.
Figure 6:
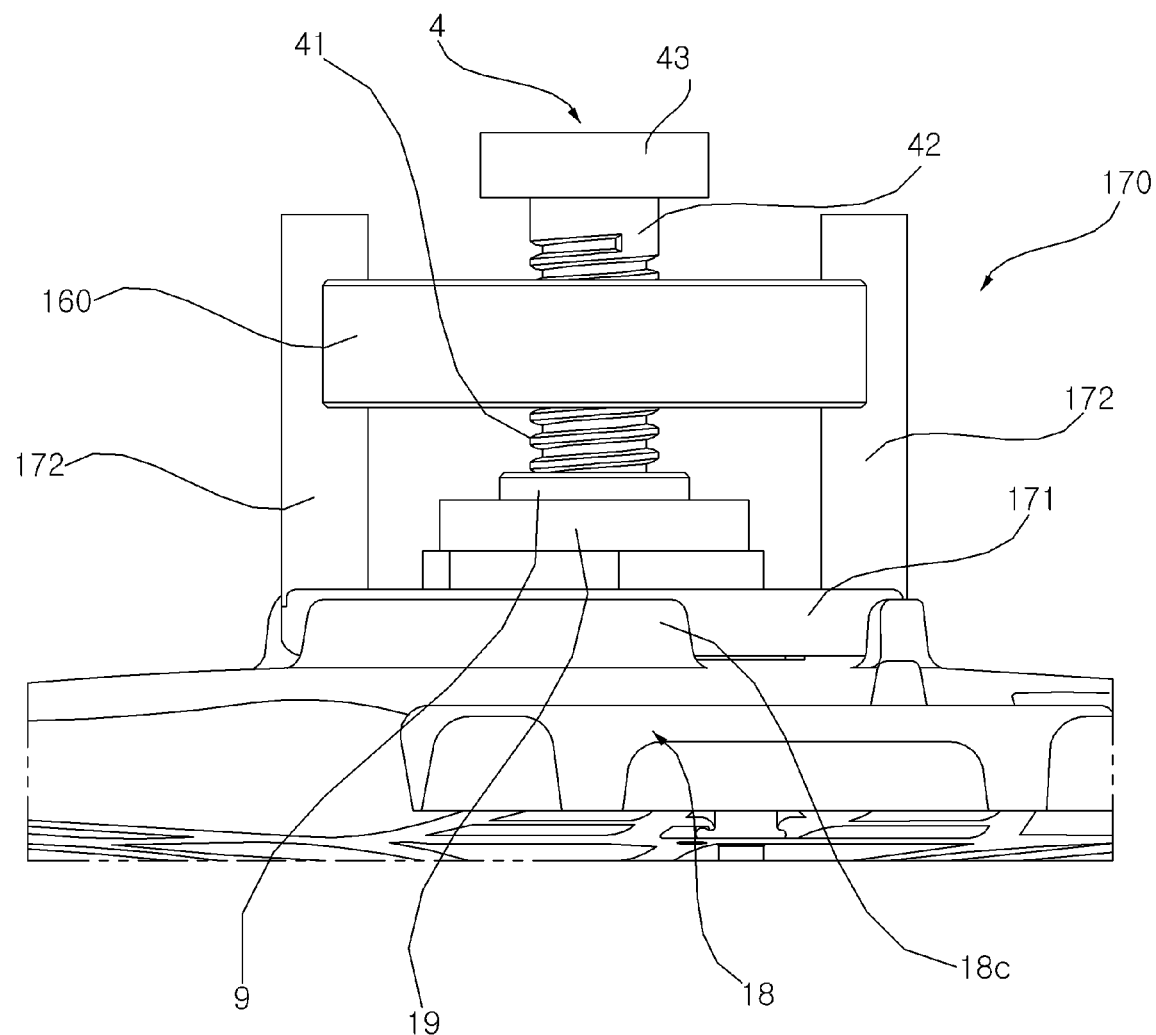
FIG. 6 is a view illustrating a portion of the washing machine of FIG. 5.
Figure 7:
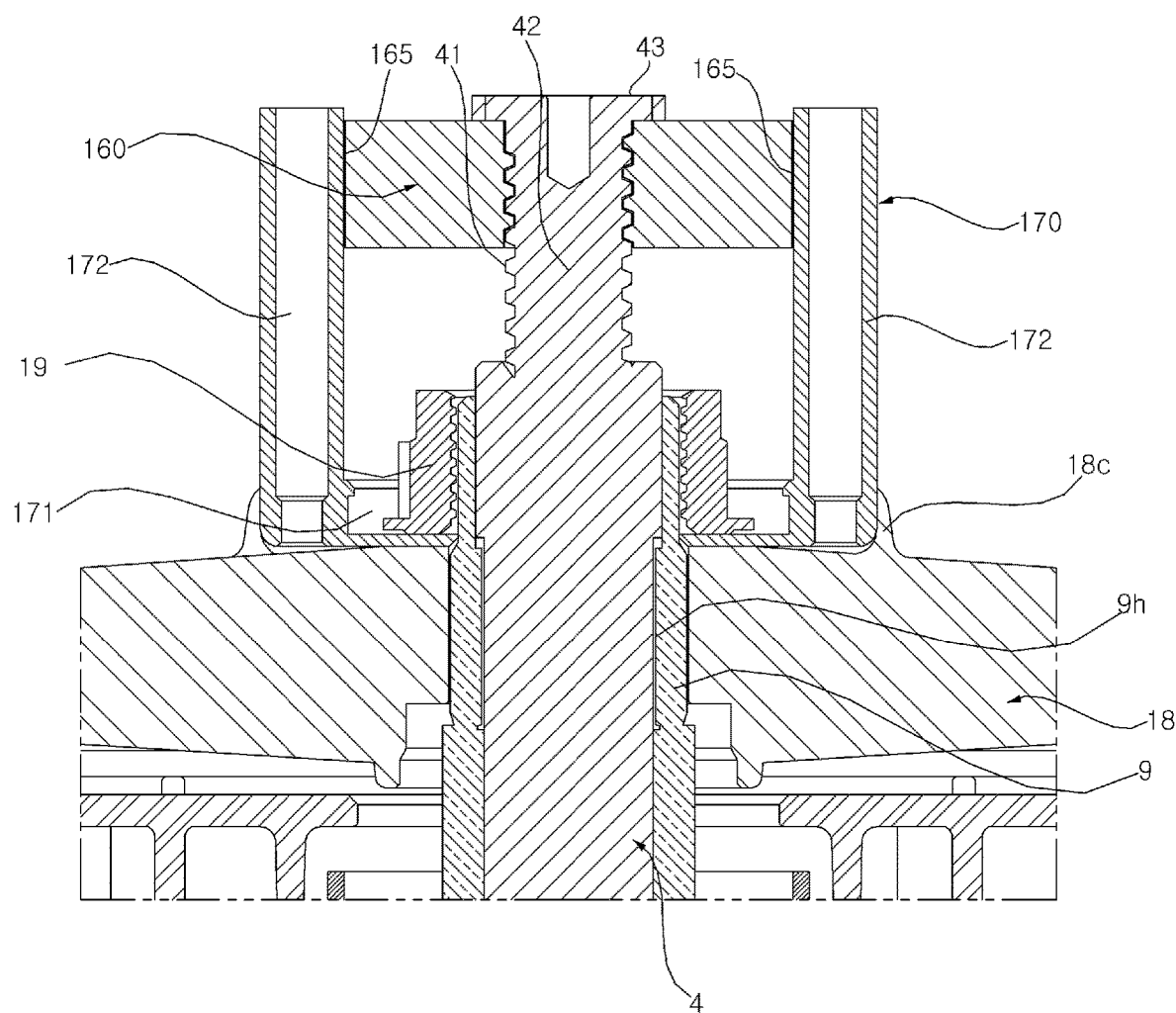
FIG. 7 is a cross-sectional view of FIG. 6.

FIG. 5 is a longitudinal cross-sectional view of a washing machine according to yet another embodiment of the present disclosure. FIG. 6 is a diagram illustrating a portion of the washing machine of FIG. 5. FIG. 7 is a cross-sectional view of FIG. 6.

Referring to FIGS. 5 to 7, the washing machine according to yet another embodiment of the present disclosure includes an outer tub 1 which accommodates wash water, an inner tub 2 which is disposed in the outer tub 1 to accommodate laundry, and rotates around a vertical axis, a motor 10 which provides torque, an outer shaft 9 which has a hollow 9h and rotates the inner tub 2, an inner shaft 4 which rotates inside the hollow 9h by the motor 10, and a pulsator 3 which is disposed in the inner tub 2 and is connected to the inner shaft 4. These parts are substantially the same as those described in the above embodiments.

However, the washing machine according to the embodiment of the present disclosure is different from the above-described embodiments in that the washing machine according to the embodiment includes the clutch 160 which is screw-coupled to the inner shaft 4 inside the hollow 9h of the outer shaft 9, and an elevation guide 170 which rotates along with the inner tub 2 when the inner tub 2 rotates, and restricts rotation of the clutch 160 when the inner shaft 4 rotates, so as to elevate the clutch 160. These parts are different from those described in the above embodiments, and thus will be described in further detail below.

When the inner shaft 4 rotates in the forward direction, and the clutch 160 reaches a predetermined raised position, the clutch 160 is restricted from being raised further, and the elevation guide 170 rotates in the forward direction. When the inner shaft 4 rotates in the reverse direction, the clutch 160 is restricted from being lowered further, and the elevation guide 170 rotates in the reverse direction.

The elevation guide 170 may be fixed to a hub base 18. Specifically, the elevation guide 170 includes a coupling plate 171 which is coupled to a top surface of the hub base 18, and at least one guide bar 172 which is extended upwardly from the coupling plate 171 and is engaged with the clutch 160.

The coupling plate 171 may be formed in a ring shape. The inner shaft 4 and the outer shaft 9 may pass through an open center portion of the coupling plate 171. The guide bar 172 may be extended upwardly from two points of the top surface of the coupling plate 171. The guide bar 172 may be disposed symmetrically.

A rib 18c, which is formed to surround the coupling plate 171, may protrude from the hub base 18. The rib 18c serves to fix the coupling plate 171 so that the coupling plate 171 may not be shaken, and a plurality of ribs 18c may be formed along the circumference of the coupling plate 171.

The clutch 160 may be elevated along the guide bar 172. The clutch 160 may be formed in a ring shape and is screw-coupled to the inner shaft 4. An elevation guide groove 165, which is slidably engaged with the guide bar 172, is formed on the outer circumferential surface of the clutch 160.

The guide bar 172 may have a circular cross-section, or may have a non-circular cross-section, such as an oval, a square, or any other polygonal shape. The guide bar 172 may be hollow or solid. The elevation guide groove 165 may have a shape corresponding to the shape of the guide bar 172, and may partially surround the guide bar 172 as shown in FIG. 6, or may fully surround the guide bar 172 such that the elevation guide groove 165 forms an aperture in the clutch 160.

The guide bar 172 and the elevation guide groove 165 of the clutch 160 prevent rotation of the clutch 160 with respect to the guide bar 172. Consequently, with the guide bar 172 extending from the coupling plate 171 which is coupled to a top surface of the hub base 18 connected to the bottom of the inner tub 2, the guide bar 172 and the elevation guide groove 165 provide an anti-rotation interface between the clutch 160 and the inner tub 2.

It is desired that two or more guide bars 172 are provided so that the clutch 160 may be stably elevated, and a plurality of elevation guide grooves 165 are engaged with each of the guide bars 172.

The raising and lowering motion of the clutch 160 may be restricted in the same manner as the above-described embodiments. However, as the clutch 160 is disposed outside of the outer shaft 9, such that depending on embodiments, when the inner shaft 4 is extended above the outer shaft 9, the lower stopper may be the top of the outer shaft 9.

The inner shaft 4 includes a shank 42 having the thread 41 which is connected to the clutch 160, and a bolt head 43 formed on the top of the shank 42. The bolt head 43 may have a coupling hole coupled with a screw 23 (see FIG. 1) which has passed through the pulsator 3. In this case, the upper stopper may be the bolt head 43 of the inner shaft 4. When the clutch 160 reaches the bolt head 43, the clutch 160 may no longer be raised, and the position of the clutch 160 at this point is determined to be a raised position. Particularly, the upper stopper may also be applied to the washing machine according to another embodiment described above with reference to FIG. 4.

In this embodiment of the present disclosure, the principle of motions of the clutch 160 according to a rotational direction of the motor 10 is substantially the same as the above-described embodiments, except that the clutch 160 is guided by the guide bar 172 between the raised position and the lowered position, and the rotation of the clutch 160 is restricted by the guide bar 172 while the inner tub 2 is in a stationary state. Accordingly, detailed description thereof will be omitted.

Although not illustrated herein, a water supply part (e.g., water supply valve) for supplying water into the outer tub 1 or the inner tub 2 may be included in the above embodiments, and a drain part (e.g., drain value or drain pump) for draining water from the outer tub 1 may be further included therein. In the above description, the level of water in the inner tub 2 may be raised by the supply of water from the water supply part, and may be lowered by the drainage by the drain part.

Further, a circulation spray device may be further included, which circulates water, supplied from the outer tub 1, through a predetermined circulation tube by using a circulation pump (not shown), and then sprays the water into the inner tub 2 through a nozzle (not shown).

Figure 8:
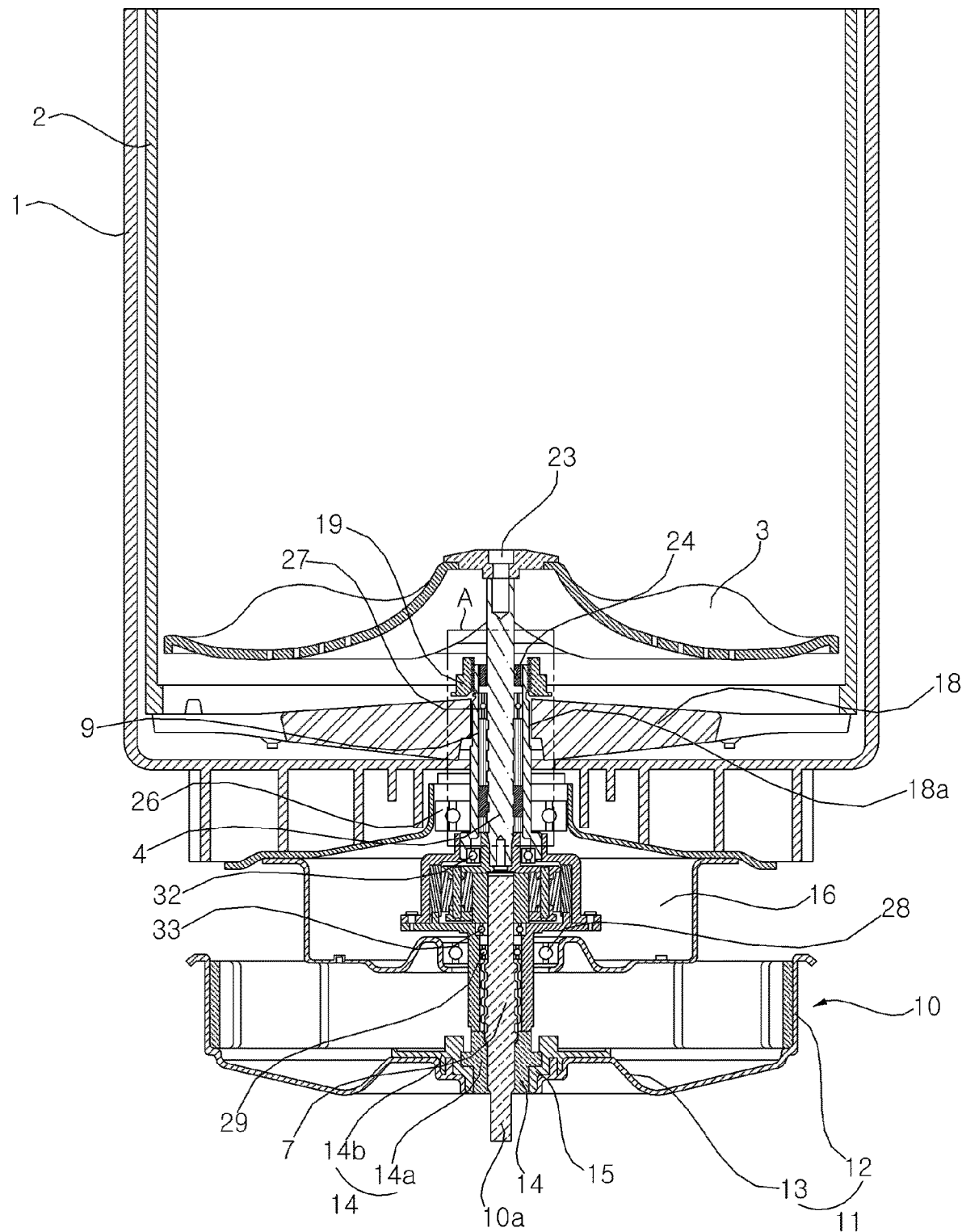
FIG. 8 is a longitudinal cross-sectional view of a washing machine according to still another embodiment of the present disclosure.
Figure 9:
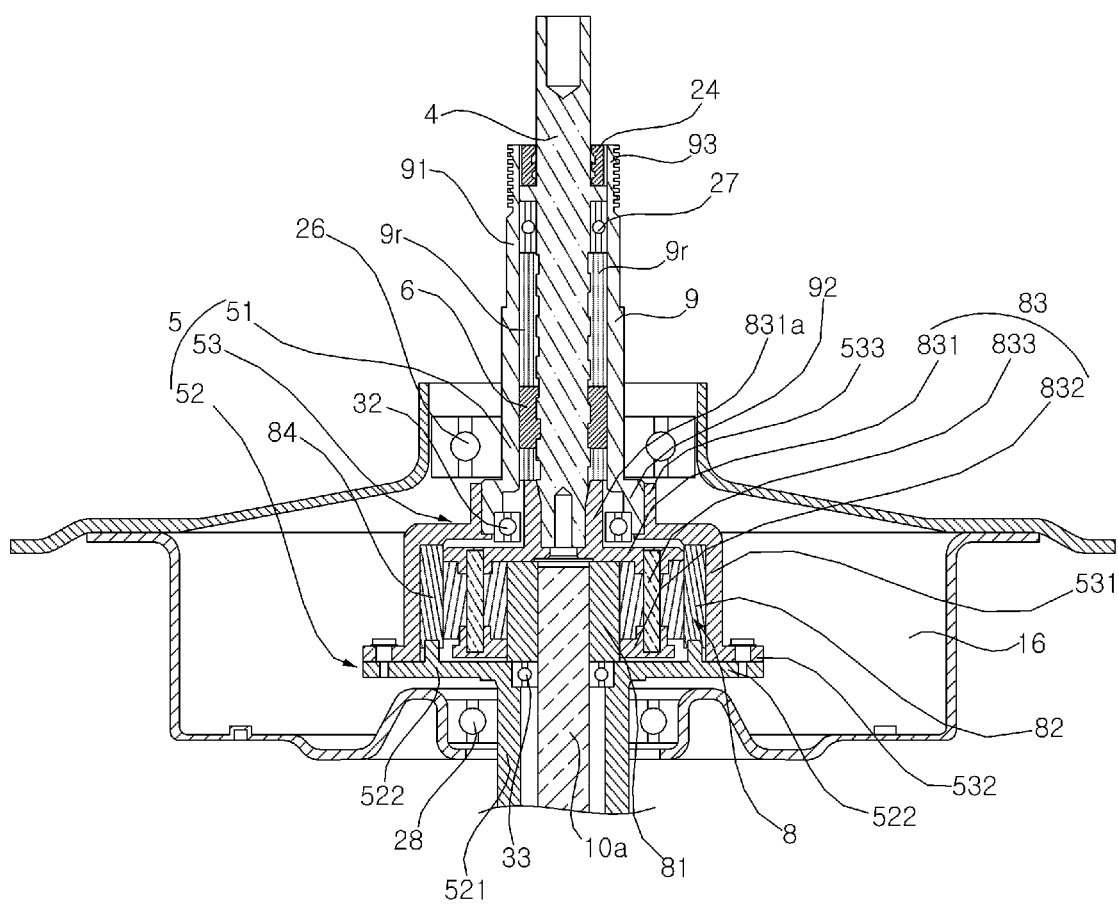
FIG. 9 is an enlarged view of a portion of the washing machine illustrated in FIG. 8.
Figure 10A:
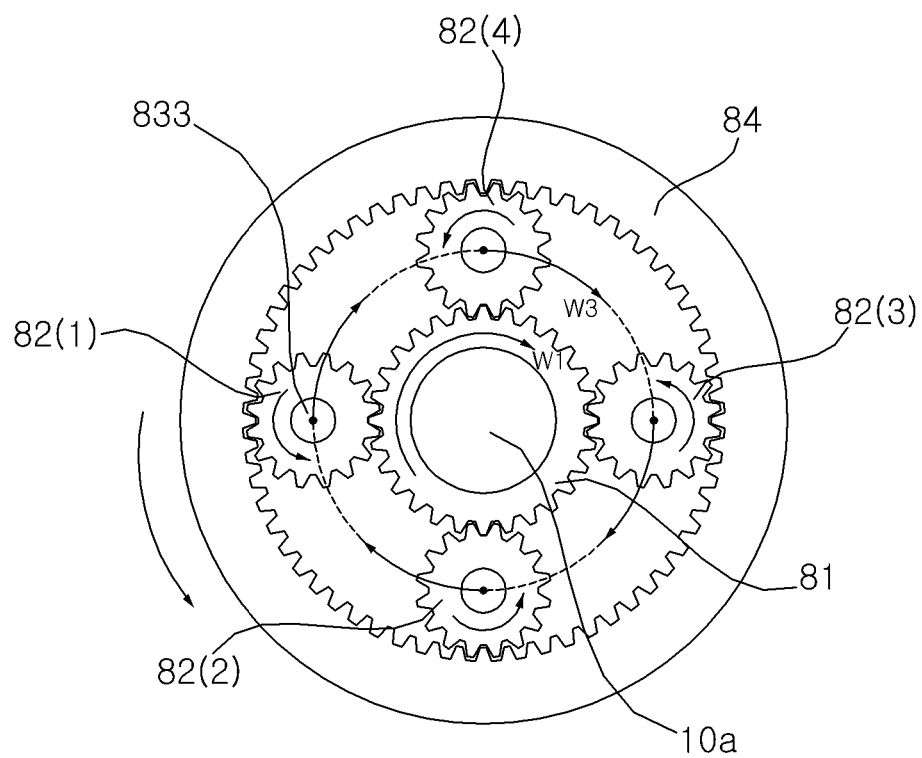
FIG. 10(a) schematically illustrates an action of a planetary gear train when a pulsator rotates relative to an inner tub, and FIG. 10(b) schematically illustrates an action of a planetary gear train when a pulsator and an inner tub rotate together.
Figure 10B:
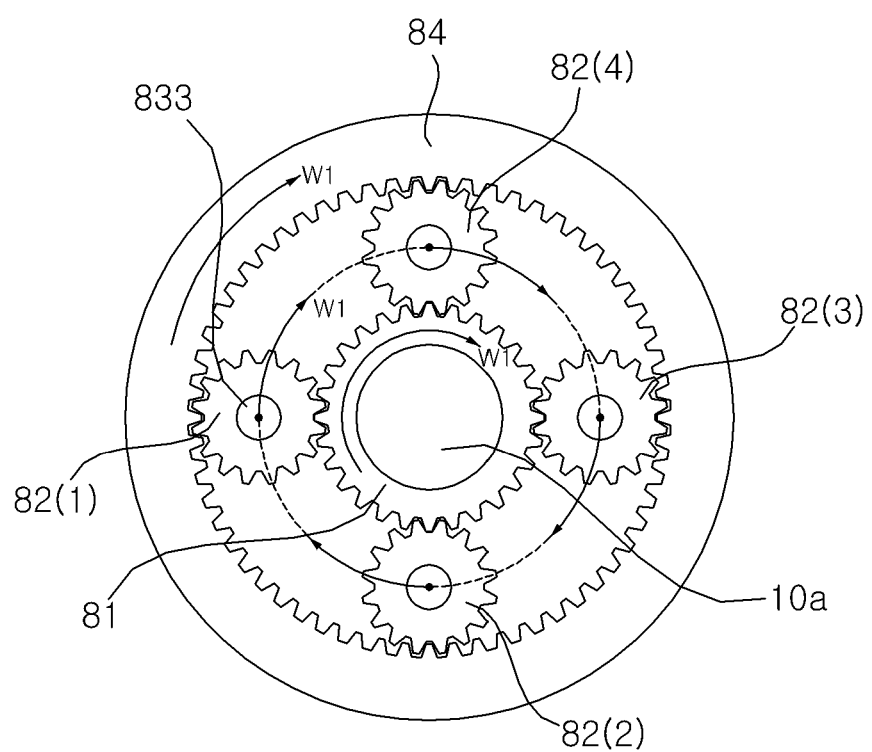
Figure 11B:
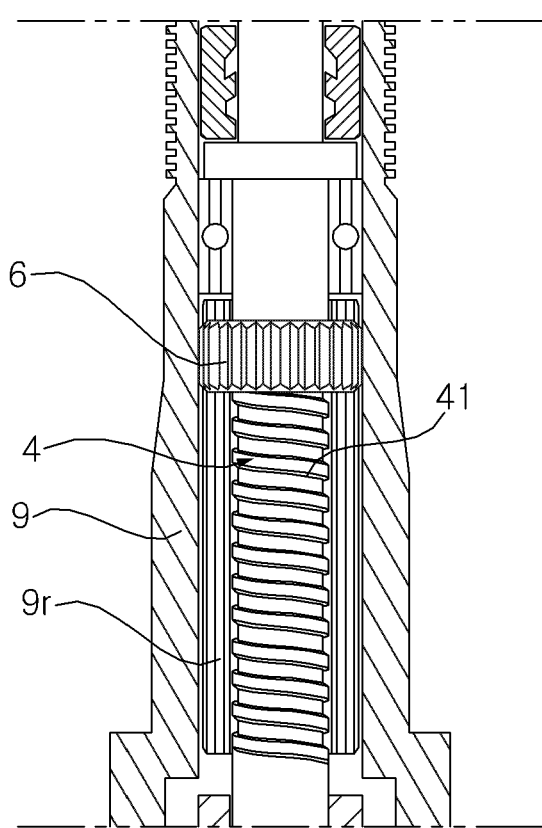

FIG. 8 is a longitudinal cross-sectional view of a washing machine according to still another embodiment of the present disclosure. FIG. 9 is an enlarged view of a portion of the washing machine illustrated in FIG. 8. FIG. 10(a) schematically illustrates an action of a planetary gear train when a pulsator rotates relative to an inner tub, and FIG. 10(b) schematically illustrates an action of a planetary gear train when a pulsator and an inner tub rotate together. FIGS. 11(a) and 11(b) are partially cut-away views of portion "A" of FIG. 8, in which FIG. 11(a) illustrates a state where a clutch is in a lowered position, and FIG. 11(b) illustrates a state where a clutch is in a raised position.

Referring to FIGS. 8 to 11, the washing machine according to still another embodiment of the present disclosure may further include a planetary gear train 8 which transfers torque of the motor 10 to rotate the inner shaft 4. The planetary gear train 8 may receive an input of torque of a drive shaft 10a, and converts the input torque according to a predetermined velocity ratio or a torque ratio, to rotate the inner shaft 4.

A movement area of the clutch 6 inside a first hollow formed at the outer shaft 9 may be provided outside of the inner tub 2. Further, the movement area of the clutch 6 may be provided below the outer tub 1. Because the movement area of the clutch 6 (or a space for installing or operating the clutch 6) is not provided inside the inner tub 2, such that the pulsator 3 may be disposed on the bottom of the inner tub 2, as in the case of a general washing machine.

The planetary gear train 8 may transfer the torque of the motor 10 to rotate the inner shaft 4. The planetary gear train 8 may convert the torque input from the drive shaft 10a according to a predetermined gear ratio, to rotate the inner shaft 4. The gear ratio may be determined according to the number of teeth of the sun gear 81, the pinion gear 82, and the ring gear 84.

The planetary gear train 8 is disposed in a gear housing 5 which is connected (or shaft-coupled) to the outer shaft 9. As the gear housing 5 is shaft-coupled to the outer shaft 9, the gear housing 5 rotates along with the outer shaft 9 during rotation of the outer shaft 9. The gear housing 5 has a boss 533 which is formed on the top thereof. The outer shaft 9 has an upper portion 91, which has an engagement groove 9r formed on the inner circumferential surface thereof, and a lower portion 92 having an outer diameter larger than that of the upper portion 91. As the lower portion 92 is connected to the boss 533, the outer shaft 9 and the gear housing 5 are shaft-coupled to each other.

The gear housing 5 includes a lower housing 52 and an upper housing 53. The lower housing 52 and the upper housing 53 are connected with each other by a coupling member such as a screw, a bolt, and the like. The lower housing 52 is formed in a tubular shape, having a second hollow which longitudinally extends in a vertical direction, and the drive shaft 10a is inserted in the second hollow.

The lower housing 52 includes a hollow shaft 521 which forms the second hollow, and a lower flange 522 which extends outwardly from the top of the hollow shaft 521 along a radial direction. A bearing 33 is interposed between the hollow shaft 521 and the drive shaft 10a, to support the hollow shaft 521 and the drive shaft 10a in a manner that allows them to rotate relative to each other.

The upper housing 53 is disposed above the lower housing 52. The upper housing 53 forms a predetermined accommodating space above the lower flange 522, and the planetary gear train 8 is disposed inside the accommodating space. The accommodating space extends vertically, having an open top and bottom.

The upper housing 53 has the boss 533 which is connected to the outer shaft 9, and the top of the accommodating space is opened by the boss 533. The upper housing 53 includes a housing main body 531 which forms an inner circumferential surface surrounding the ring gear 84, and the upper flange 532 which extends outwardly from the open bottom of the housing main body 531 along a radial direction, and is connected with the lower flange 522, in which the boss 533 extends upwardly from the housing main body 531.

The planetary gear train 8 includes the sun gear 81, the pinion gear 82, the carrier 83, and the ring gear 84. The sun gear 81 is connected to the drive shaft 10a, to rotate integrally with the drive shaft 10a. In the embodiment, the sun gear 81 is a helical gear, and the pinion gear 82 and the ring gear 84 may also have teeth of a helical gear shape to correspond to the sun gear 81, but are not limited thereto. For example, the sun gear 81 may be a spur gear, and the pinion gear 82 and the ring gear 84 may have teeth of a spur gear shape.

The ring gear 84 may be fixed inside the housing main body 531 (or fixed to the housing main body 531). That is, the ring gear 84 may be integrally formed with the gear housing 5. The ring gear 84 has teeth on the inner circumferential surface that defines a ring-shaped opening.

The pinion gear 82 is interposed between the sun gear 81 and the ring gear 84, to be engaged with the sun gear 81 and the ring gear 84. A plurality of pinion gears 82 (1), 82 (2), 82 (3), and 82 (4) may be disposed along the circumference of the sun gear 81, and each of the pinion gears 82 may be rotatably supported by the carrier 83. The pinion gear 82 may be made of polyoxymethylene (POM) resin.

The carrier 83 is connected (shaft-coupled) to the inner shaft 4. The carrier 83 is a type of a link that connects the pinion gear 82 and the inner shaft 4. That is, as the pinion gear 82 revolves around the sun gear 82, the carrier 83 rotates, and the inner shaft 4 rotates accordingly.

The carrier 83 includes an upper plate 831 having a boss 831a which is connected to the inner shaft 4, a lower plate 832 which is spaced apart downwardly from the upper plate 831, and has a through-hole which is formed at the center of the lower plate 832, and through which the drive shaft 10a passes, and a gear shaft 833 which connects the upper plate 831 and the lower plate 832. A plurality of gear shafts 833 may be provided along a circumferential direction, and the pinion gear 82 may be installed at each of the gear shafts 833.

The gear shaft 833 may be installed to be rotatable with respect to the upper plate 831 and/or the lower plate 832, such that the pinion gear 82 and the gear shaft 833 may rotate together. Alternatively, rotation of the gear shaft 833 may be restricted, and the pinion gear 82 may rotate with respect to the gear shaft 833.

The boss 831a formed at the upper plate 831 may be disposed in the boss 533 formed at the aforementioned upper housing 53, and the bearing 32 may be interposed between the boss 831a and the outer shaft 9.

Hereinafter, the motion of the clutch 6 will be described with reference to FIGS. 11(*a*) and 11(*b*).

FIG. 11(*b*) illustrates a state where the clutch 6 reaches a raised position. In this state, when the inner shaft 4 rotates in the forward direction, the clutch 6 may no longer be raised, such that the outer shaft 9 rotates in the forward direction. This is the case where the pulsator 3 and the inner tub 2 rotate together in the forward direction. By contrast, when the inner shaft 4 rotates in the reverse direction while the clutch 6 reaches the raised position, the clutch 6 is lowered.

When the drive shaft 10a rotates while the clutch 6 is between the raised position and the lowered position, the outer shaft 9 may be induced to rotate due to inertia or load on the inner tub 2. That is, when the load acting on the inner shaft 4 by the inner tub 2 is sufficiently large, the outer shaft 9 is maintained in a stationary state, and only the inner shaft 4 rotates, or when the load is not large enough to restrict the rotation of the outer shaft 9, the outer shaft 9 may rotate in an opposite direction to the inner shaft 4.

FIG. 10(*a*) illustrates an action of a planetary gear train in the case where the drive shaft 10a rotates in the reverse direction, and the clutch 6 is lowered. Assuming that rotation of the ring gear 84 is restricted, it can be seen that when the drive shaft 10a rotates at an angular speed of W1, the carrier 83 rotates at an angular speed of W3 in the same direction as the drive shaft 10a (W1>W3).

In addition, a maximum angle (or number of rotations), at which the pulsator 3 may continuously rotate while the inner tub 2 is in a stationary state, may be determined according to a maximum angle (or number of rotations) at which the clutch 6 may continuously rotate between the lowered position and the raised position. In the section where the clutch 6 is raised, the pulsator 3 may rotate in the forward direction or the reverse direction according to a rotational direction of the motor 10.

Particularly in the case where the clutch 6 is between the raised position and the lowered position without reaching either one of these positions, the rotational direction of the pulsator 3 is determined according to the rotational direction of the inner shaft 4, such that by controlling the rotational direction of the motor 10, stirring rotation of the pulsator 3 may be induced.

FIG. 11(*a*) illustrates a state where the clutch 6 reaches the lowered position. In this state, when the inner shaft 4 rotates in the reverse direction, the clutch 6 may be no longer lowered, such that the outer shaft 9 rotates in the reverse direction. This is the case where the pulsator 3 and the inner tub 2 rotate together in the reverse direction.

FIG. 10(*b*) illustrates a case where the drive shaft 10a continuously rotates in the reverse direction while the clutch 6 reaches the lowered position, i.e., a case where the pulsator 3 and the inner tub 2 rotates together, and it can be seen that both the carrier 83 and the ring gear 84 rotate integrally with the drive shaft 10a (i.e., at the same angular speed) in the same direction as the drive shaft 10a.

The washing machine of the present disclosure has an effect in that a clutch system, which connects or disconnects a wash shaft (or inner shaft) and a dehydration shaft (or outer shaft), may be simplified compared to a general clutch system. Particularly, the clutch system of the present disclosure operates by a motor which provides power for rotating a pulsator, such that a separate power source or a driving source for operating the clutch is not required.

Further, the wash shaft and the dehydration shaft are connected or disconnected by controlling a rotational direction of the motor, such that the clutch system of the present disclosure may be controlled in a very simple manner.

In the washing machine of the present disclosure, a clutch system, which connects or disconnects an inner shaft and an outer shaft, may be simplified compared to a general clutch system. Particularly, the clutch system of the present disclosure operates by a motor which provides power for rotating the inner shaft, such that a separate power source or a driving source for operating the clutch is not required.

Further, the inner shaft and the outer shaft are connected or disconnected by controlling a rotational direction of the motor, such that the clutch system of the present disclosure may be controlled in a very simple manner.

In addition, a screw coupling between the inner shaft and the clutch or a spline coupling between the clutch and the outer shaft is a very firm shaft-coupling, such that even when the inner shaft is rotated by strong torque, components are not damaged during power transfer. Accordingly, even when using a planetary gear train which outputs torque after increasing torque by adjusting a gear ratio, operations may be performed stably under a high load without damage of components. Although the planetary gear train 8 has been illustrated with the embodiment shown in FIGS. 8 to 11 having a clutch 6, it is envisioned that the planetary gear train 8 may be utilized with the embodiment shown in FIGS. 5 to 7 having the clutch 160.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A washing machine, comprising:
   an outer tub provided to accommodate wash water therein;
   an inner tub located in the outer tub, the inner tub including a hub base at a lower side thereof, the inner tub being provided to accommodate laundry therein;
   a pulsator located in the inner tub;
   an outer shaft configured to be rotated integrally with the hub base and the inner tub;
   an inner shaft located in the outer shaft, the inner shaft being configured to rotate the pulsator;
   a motor configured to rotate the inner shaft;
   an elevation guide comprising a coupling plate coupled to a top surface of the hub base so that the elevation guide is rotated together with the inner tub, and a guide bar extending upwardly from the coupling plate; and
   a clutch configured to selectively transmit rotation of the inner shaft to the inner tub, the clutch including an elevation guide groove slidably engaged with the guide bar,
   wherein the clutch and the inner shaft are interconnected by a threaded interface, and the clutch and the inner tub are interconnected by the elevation guide so that rotation of the inner shaft with respect to the elevation guide in a first direction raises the clutch along the guide bar according to relative rotation of the threaded interface, and rotation of the inner shaft with respect to the elevation guide in a second direction lowers the clutch along the guide bar according to relative rotation of the threaded interface, wherein, when the inner shaft rotates in the first direction and the clutch reaches a predetermined upper position, the clutch is restrained from being raised further by an upper stopper, and the clutch rotates in the first direction with the elevation guide and the inner tub rotates in the first direction together with the inner shaft, and wherein, when the inner shaft rotates in the second direction and the clutch reaches a predetermined lower position, the clutch is restrained from being lowered further by a lower stopper, and the clutch rotates in the second direction with the elevation guide and the inner tub rotates in the second direction together with the inner shaft.

2. The washing machine of claim 1, wherein the upper stopper and the lower stopper are provided on the inner shaft.

3. The washing machine of claim 1, wherein the elevation guide groove is located on an outer peripheral surface of the clutch.

4. The washing machine of claim 1, further comprising a fastener threadably coupled to the outer shaft to secure the coupling plate to the hub base.

5. The washing machine of claim 4, wherein the hub base includes a rib to position the coupling plate on the hub base.

* * * * *